May 9, 1950          C. M. JAMESON          2,507,306

AUTOMATIC BRAKING DEVICE

Filed April 28, 1945          5 Sheets-Sheet 2

INVENTOR.
Charles M. Jameson.
BY
Harness, Dickey & Pierce.
ATTORNEYS.

May 9, 1950  C. M. JAMESON  2,507,306
AUTOMATIC BRAKING DEVICE
Filed April 28, 1945  5 Sheets-Sheet 3
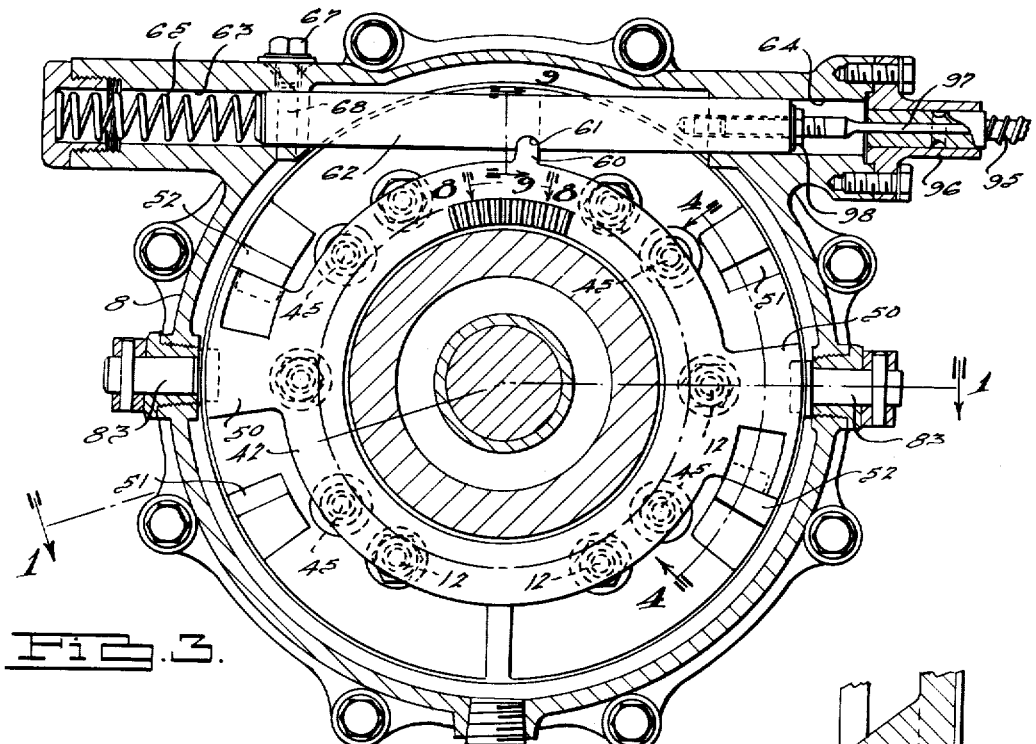
Fig. 3.
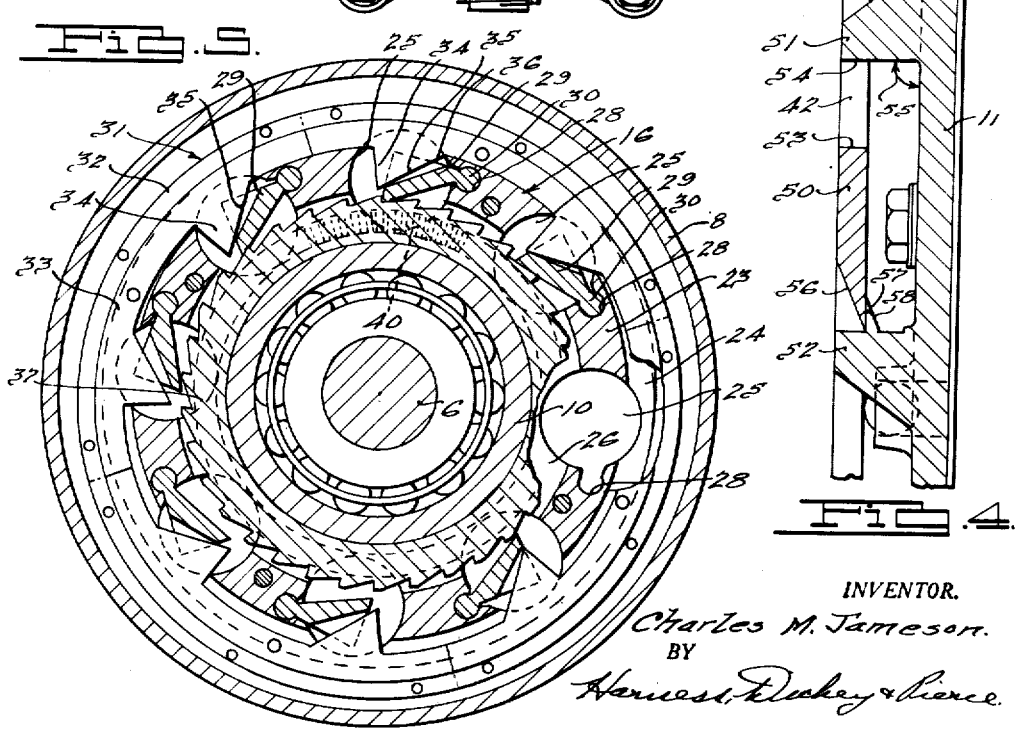
Fig. 5.
Fig. 4.
INVENTOR.
Charles M. Jameson.
BY
Harness, Dickey & Pierce.
ATTORNEYS.

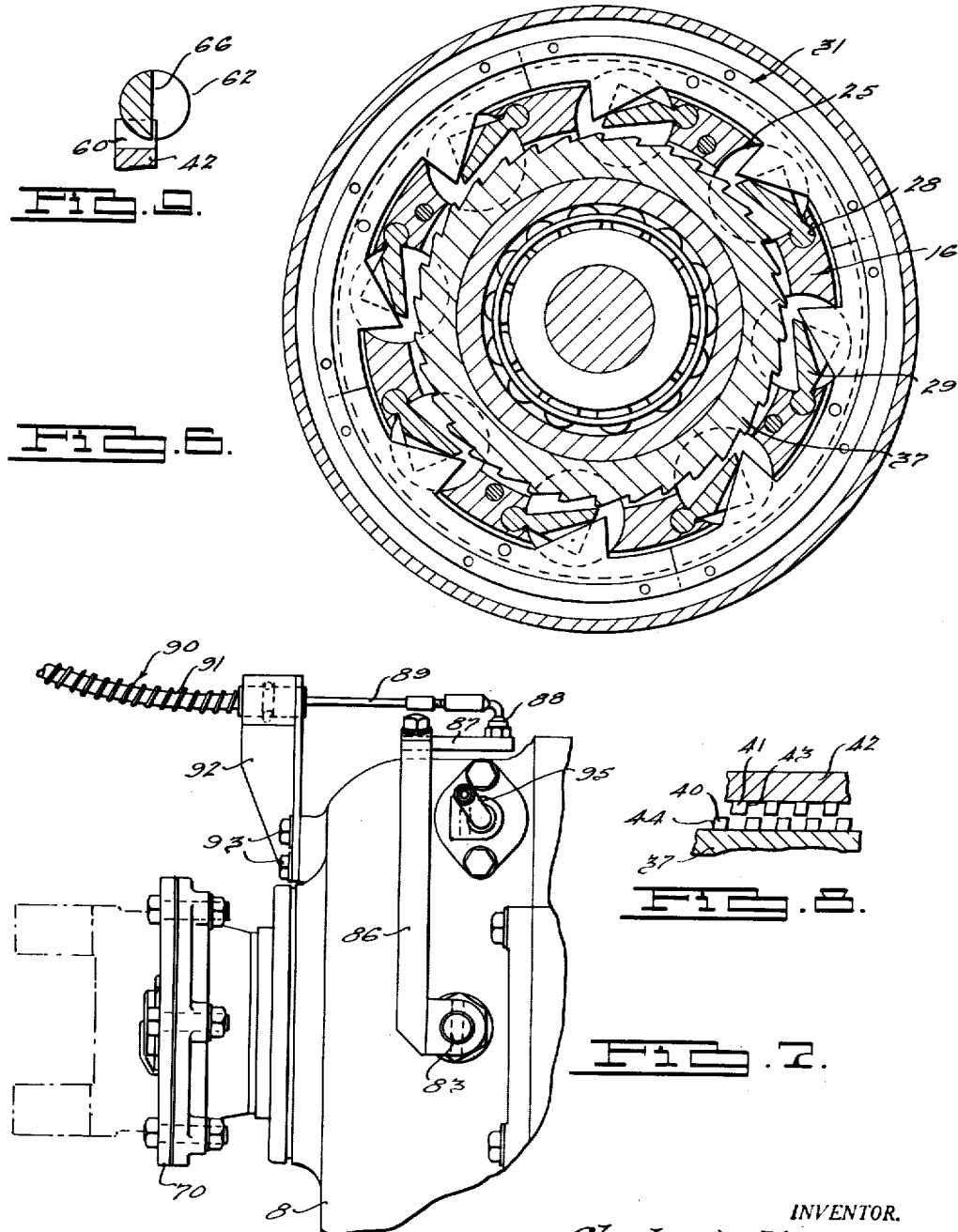

May 9, 1950 C. M. JAMESON 2,507,306
AUTOMATIC BRAKING DEVICE
Filed April 28, 1945 5 Sheets-Sheet 5
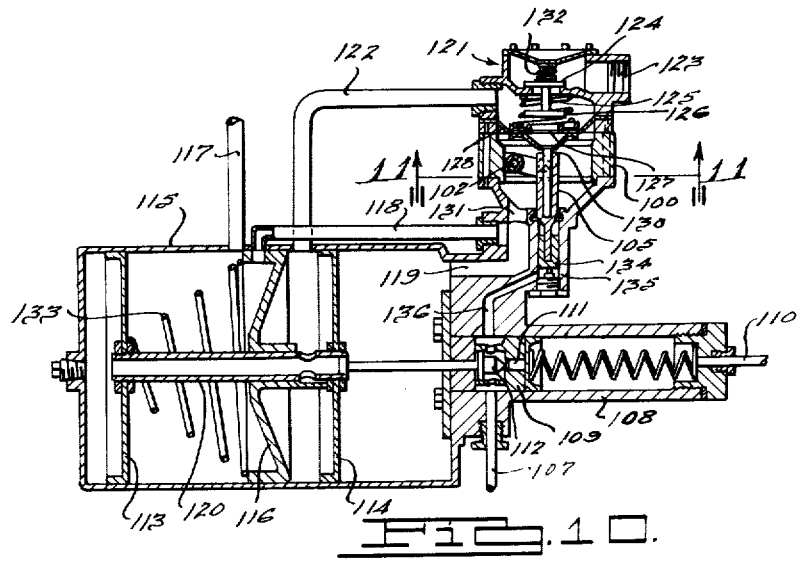
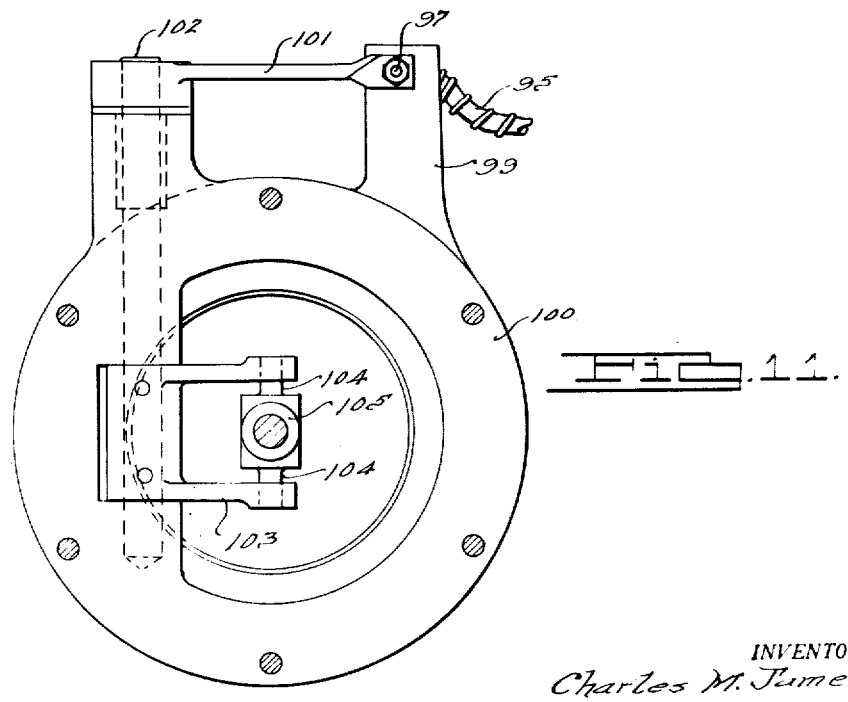
INVENTOR.
Charles M. Jameson,
BY
Harness, Dickey & Pierce
ATTORNEYS.

Patented May 9, 1950

2,507,306

UNITED STATES PATENT OFFICE 2,507,306

AUTOMATIC BRAKING DEVICE

Charles M. Jameson, Battle Creek, Mich.

Application April 28, 1945, Serial No. 590,843

20 Claims. (Cl. 192—4)

The present invention relates to a mechanism for automatically preventing unintentional movement of a motor vehicle and constitutes an improvement upon a mechanism for the same purpose disclosed in applicant's copending application, Serial No. 465,320, filed November 12, 1942, now Patent No. 2,486,289. The mechanism of the present application, as well as that of the aforementioned copending application, operates to hold brakes of a motor vehicle applied after the vehicle has been brought to a stop by application of the brakes. It also operates automatically to prevent unintentional rollback of the vehicle on a hill either by applying the brakes or by otherwise locking the wheels against reverse rotation, or both. The present mechanism is similar to that of said copending application in that release of the brakes when they are being held applied by the mechanism is automatically effected in response to the application of a forward driving torque to the power transmission system of the motor vehicle by the engine.

Numerous attempts have been made over a period of many years to devise a satisfactory mechanism for automatically preventing unintentional rollback of a motor vehicle, as it has long been recognized that a satisfactory mechanism for that purpose would materially facilitate driving. One of the important obstacles to the fulfillment of this need has been the difficulty of devising a simple, foolproof, and entirely satisfactory means for rendering the mechanism inoperative in order to permit driving in reverse gear.

One expedient which has been frequently suggested as a solution to this problem has been to employ the antirollback mechanism in connection with the countershaft of an ordinary transmission, since the direction of rotation of the countershaft is always the same regardless of the direction in which the vehicle is driven by the engine. This expedient, however, is subject to the objection that the device is ineffective unless the transmission is in forward gear. Moreover, such an arrangement cannot be employed in connection with an automatic brake holding device of the type mentioned.

All other prior attempts to solve the problem have involved the provision of some mechanical connection between the reverse shifting mechanism of the vehicle transmission and the antirollback device effective to render the device inoperative on a shift of the transmission to reverse gear. While fully operative means of this type are disclosed in said copending application they are subject to the disadvantage that they require alterations in the vehicle transmission and are relatively complicated.

Accordingly, it is the principal object of the present invention to provide an antirollback mechanism or automatic brake holding device, or a combination of the two, which is automatically rendered inoperative in response to an application of torque to the motor vehicle power transmission system by the engine in either direction and which, therefore, may be entirely divorced from the motor vehicle transmission and will require no external control for normal operation.

A more specific object of the present invention is to provide in a mechanism of the type disclosed in said copending application, torque responsive means associated with the power transmission system of the vehicle for rendering the mechanism inoperative upon application of a reverse driving torque by the motor of the vehicle to the power transmission system.

Another object of the present invention is to provide a torque responsive means for the purpose mentioned comprising a lost motion connection in the power transmission system.

Another object of the invention is to provide in combination with such a lost motion mechanism, means to prevent lost motion in the power transmission system of the vehicle under forward driving conditions.

Another object of the present invention is to provide an improved combination of a torque responsive means for rendering a brake holding and/or an antirollback mechanism inoperative, and means to maintain the mechanism in inoperative condition until a subsequent application of the vehicle brakes.

Another object of the present invention is to improve the mechanism of said copending application by providing an improved release mechanism for the one-way ratchet clutch.

Other objects and advantages of the invention will become apparent from the following specification, the accompanying drawings, and the appended claims.

In the drawings

Figure 3 is a section taken on the line 3—3 of Figure 1.

Figure 4 is a fragmentary section taken on the line 4—4 of Figure 3.

Figure 5 is a section taken on the line 5—5 of Figure 1, showing the ratchet clutch in engaged condition.

Figure 6 is a view similar to Figure 5 showing the ratchet clutch disengaged.

Figure 7 is a fragmentary side elevation of the mechanism shown in Figures 1 and 2.

Figure 8 is a fragmentary sectional view taken on the line 8—8 of Figure 3.

Figure 9 is a fragmentary section taken on the line 9 of Figure 3.

Figure 10 is a more or less diagrammatic view in section of the vacuum booster brake mechanism showing the manner in which the present invention may be associated therewith.

Figure 11 is a section taken on the line 11—11 of Figure 10.

In accordance with the present invention the automatic brake holding and no-back device is entirely independent of the change-speed transmission of the vehicle and, accordingly, may be mounted anywhere in the power transmission system between the reverse gearing and the driven wheel of the vehicle. It will be understood, therefore, that the expression "power transmission system of the vehicle," as used herein, refers to that portion of the power transmission system between the reverse gearing and the driven wheels. The unit may be mounted adjacent or within the transmission casing, the transfer position box of a four-wheel drive vehicle, intermediate the two propeller shafts which are employed in series on some vehicles, or within the rear axle housing. However, for numerous practical reasons it has been found desirable to mount the unit in connection with the stub pinion shaft of a rear axle differential housing. Accordingly, the mechanism of the present invention is so illustrated in the present application.

Figure 1:
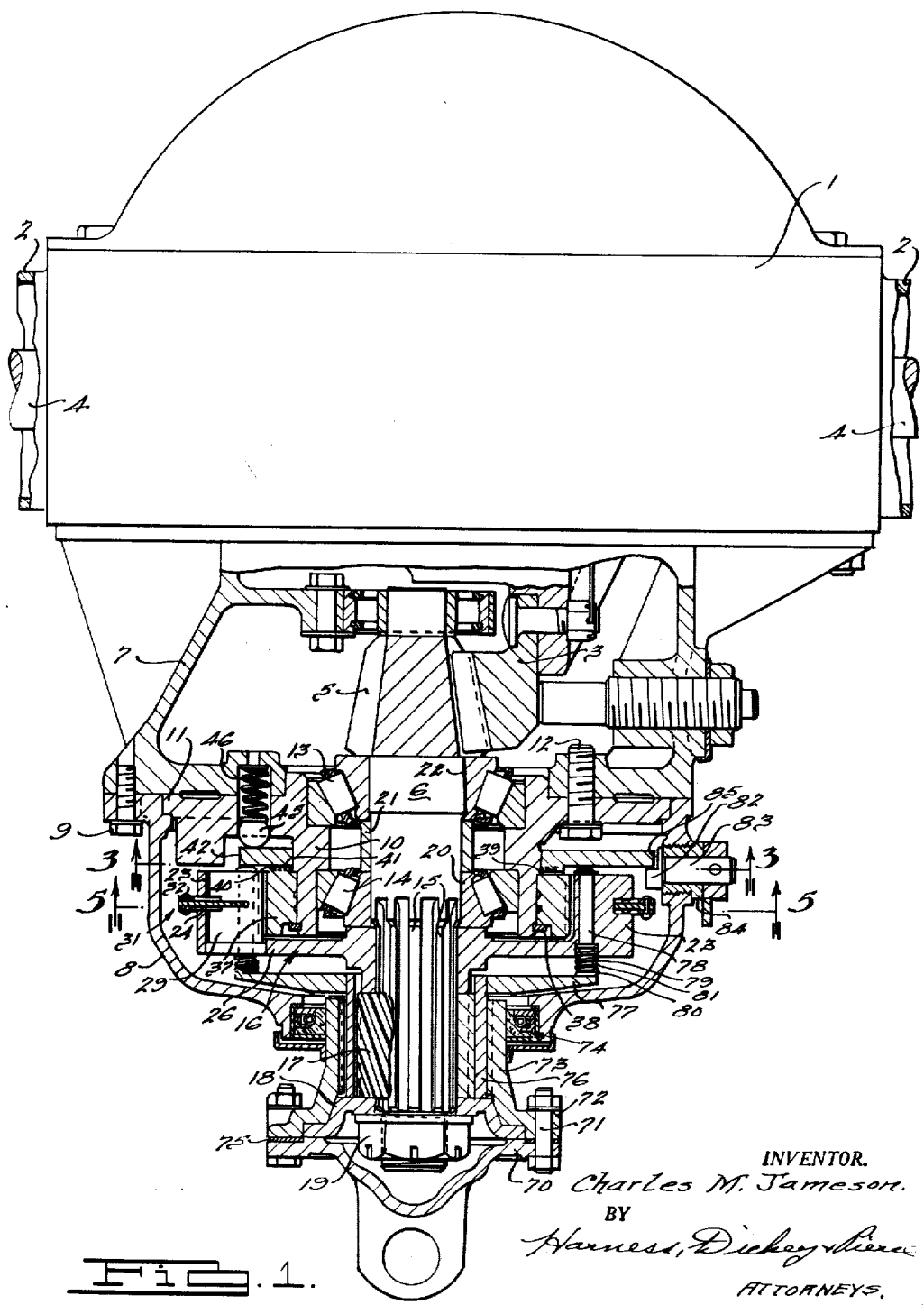
Figure 1 is a plan view, partly in section, on the line 1—1 of Figure 3 showing the application of the present invention to a conventional rear axle differential housing.
Figure 2:
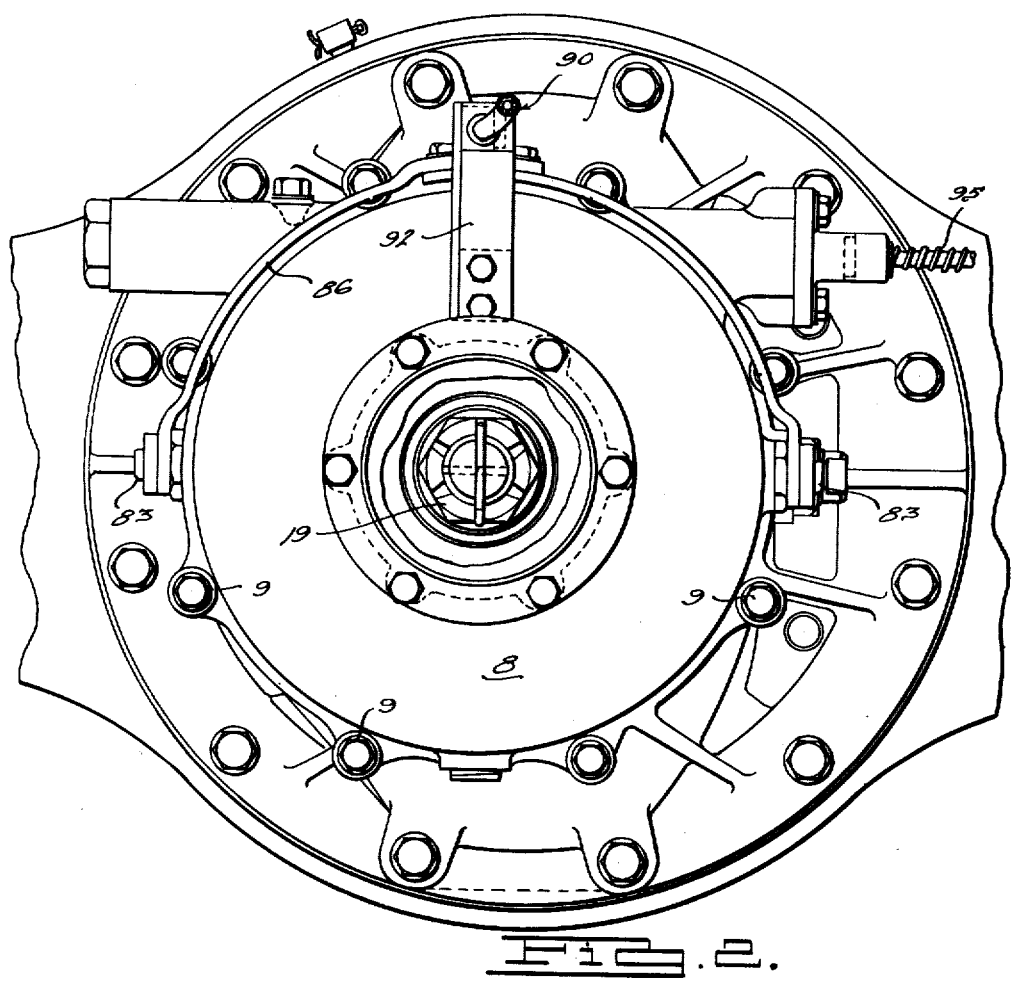
Figure 2 is a front elevation of the mechanism shown in Figure 1.

Referring to the drawings, and particularly to Figures 1, 2, and 7, there is illustrated in part a conventional rear axle housing assembly comprising a differential housing 1 associated with a pair of oppositely projecting axle housing arms 2. The differential housing contains a ring gear 3, which is connected to a pair of live axle shafts 4 by means of differential gearing in the usual manner. The ring gear 3 is adapted to be driven by a bevel pinion 5, the stub shaft 6 of which is journaled on a forwardly projecting or bell portion 7 of the housing.

In accordance with the present invention the stub shaft 6 of the bevel pinion 5 is slightly elongated and enclosed within a specially formed housing section 8 within which is also mounted the major portion of the mechanism of the present invention. In addition, a special form of lost motion connection is provided between the stub shaft 6 and the propeller shaft of the vehicle.

As best shown in Figures 1 and 2, the housing 8 is secured to the front face of the bell section 7 by a plurality of cap screws 9. A special form of sleeve 10 having a flange 11 is secured to the forward face of the bell section 7 by means of a plurality of cap screws 12 arranged in the manner best indicated in the Figures 1 and 3. The sleeve 10 supports the races of a pair of tapered roller bearings 13 and 14 which in turn support and journal the stub shaft 6 of the bevel pinion 5. Beyond the bearings 13 and 14 the stub shaft 6 is provided with a plurality of sliding splines 15 upon which is splined a pawl carrier indicated generally at 16. The hub of the pawl carrier is fixed against sliding movement on the splines 15 by a splined sleeve 17 fitted on the splines 15. An internally splined plate 18 is likewise fitted on the splines 15 and a nut 19, which is threaded upon a reduced extremity of the stub shaft 6, clamps the plate 18, the sleeve 17, and the hub of the pawl carrier 16 against the inner race 20 of the tapered roller bearing 14. The inner race 20 of the bearing 14 in turn bears against a spacing sleeve 21 which in turn bears against the inner race 22 of the tapered roller bearing 13. The race 22 seats against the ends of the teeth of the bevel pinion 5. Thus the complete assembly is clamped in fixed position on the stub shaft 6 by means of the nut 19.

As best shown in Figures 1 and 5 the pawl carrier 16 is in the form of a wheel having a rearwardly projecting flange 23 provided with a relatively narrow peripheral slot 24. A plurality of holes 25 are formed entirely through the pawl carrier parallel to its axis. These holes are located largely in the rim section 23 but extend inwardly into the radially extending flange 26 of the pawl carrier. Adjacent each of the holes 25 a smaller parallel hole 28 is drilled entirely through the pawl carrier, and the intermediate metal is cut away so that the openings 25 and 28 communicate with each other. A pawl member 29 is located in each of the openings 25 and is provided with an enlarged cylindrical end section 30 which is journaled in the adjacent opening 28.

A built-up pawl retaining ring, indicated generally at 31, is mounted in the peripheral groove 24 of flange 23. The ring 31 is made up of a pair of continuous one-piece circular strips 32 between which are riveted or otherwise suitably secured an inner ring member 33 made up in four equal arcuate sections. The ring 31 is assembled in association with the pawl carrier 16 by positioning the four arcuate sections of the inner ring member 33 in their proper relative positions within the groove 24 and thereafter riveting the circular section rings 32 to opposite sides of the inner sections 33. It will be noted that the internal diameter of the outer rings 32 is greater than that of the pawl carrier, whereas the internal diameter of the inner rings 33 is less than that of the pawl carrier. The inner section 33 is provided with a plurality of inward projections 34, having one for each pawl. These projections enter the openings 25 and have sloping side edges 35 which extend into slots 36 formed in the pawls and bear against the bottom of the slots to hold the pawls against outward pivotal movement.

An annular ratchet wheel 37 is freely journaled on the sleeve 10 and held against axial displacement thereon by means of a snap ring 38 and a shoulder 39 formed on the sleeve 10. The ratchet wheel is provided with a plurality of teeth which, as best shown in Figures 5 and 6, are adapted to co-operate with the pawls 29.

It is also provided on its back face with a set of dog clutch teeth 40 adapted to co-operate with a corresponding set of dog clutch teeth 41 mounted on a holding member 42 which is likewise journaled on the sleeve 10 for rotational and axial sliding movement with respect thereto.

The pawl retaining ring 31 and its pawl engaging projections 34 are so arranged that when the ring is concentric with the axis of the stub shaft 6, as illustrated in Figure 6, it will permit all of the pawls 29 to disengage the ratchet wheel. This condition will exist on forward motion of the vehicle during which the pawl ring will rotate in clockwise direction, as viewed in Figures 5 and 6, and the pawls will override the ratchet wheel 37 freely. It will be observed that when the pawl ring is rotating clockwise, as viewed in Figures 5 and 6, the pawls will be held outwardly, in the position shown in Figure 6, by centrifugal force and hence will not contact the ratchet wheel. As a result, the pawl and ratchet assembly is free from wear during all forward driving.

In the particular embodiment of the invention shown, the ratchet wheel is provided with 34 teeth, and the pawl ring with eight pawls. At least three, and usually four, of the pawls will normally be urged into engagement with the ratchet wheel by gravity when the pawl carrier is not rotating. Consequently, the space between the equally spaced pawls is equal to four and one-fourth teeth on the ratchet wheel. So long as four teeth are in position to engage the ratchet by gravity, the maximum backlash possible in the mechanism will be one-fourth of the ratchet tooth space. When the vehicle is brought to a stop in any manner the pawl ring 31 and the pawls 29 will tend to move downwardly under the influence of gravity, thus causing an operative engagement of one of the pawls with a ratchet tooth. If thereafter the vehicle moves rearwardly the pawl carrier 16 will rotate counterclockwise, as viewed in Figure 5, and thereby drive the ratchet wheel in a counterclockwise direction. It will be observed, as best shown in Figure 5, that when one of the upper pawls engages the ratchet wheel the pawl ring 31 assumes an eccentric position with reference to the axis of the stub shaft 6, not only as the result of its own weight but under the influence of the pawls on the lower side of the pawl carrier. As a result of this eccentric position centrifugal force acting on the pawls, which are not in engagement with the ratchet wheel and on the eccentric ring 31, is transmitted to the pawl which does operatively engage the ratchet wheel and thus holds that pawl against disengagement in the manner set forth in applicant's before mentioned copending application.

In accordance with the present invention additional means in the form of projections 34 on the pawl ring 31, and particularly the sloping edges 35 of the projections 34, are provided to augment the force acting to retain the operative pawl in engagement with the ratchet during reverse rotation of the pawl carrier. It will be understood that the housing containing the mechanism of the present invention will be filled, or partially filled, with a relatively heavy lubricant of the type normally employed in a rear axle differential mechanism. This lubricant will exert a substantial frictional drag on the pawl ring 31, which drag is augmented by the rivets employed to secure the composite ring together. This force will tend to cause a rotation of the ring counterclockwise, as viewed in Figure 5, with reference to the pawl carrier 16, thus causing the sloping edges 35 of the projections 34 to exert an additional camming force tending to hold the operative pawl in engagement with the ratchet wheel. If the force resulting from the frictional drive on the pawl ring exceeds the centrifugal force acting through the pawl ring, the frictional drag will cause the eccentricity of the pawl ring to reduce, and vice versa, with the result that the greater of the two forces is always available to hold the pawl in engagement with the ratchet during rearward travel of the vehicle.

Maintenance of operative engagement between the pawl and the ratchet wheel during reverse travel of the vehicle is necessary since otherwise the dog clutch between the ratchet wheel and the holding ring 42 would engage, as hereinafter pointed out in greater detail, and there would be a possibility that thereafter one of the pawls would fall into engagement with the then stationary ratchet wheel and impose an excessive shock load on the mechanism.

The co-operating clutch teeth 40 and 41 on the ratchet wheel 37 and holding ring 42, respectively, are constructed in accordance with the corresponding dog clutch teeth disclosed in applicant's aforementioned copending application, except that the load carrying sides of the teeth are not so sloped as to cause disengagement of the clutch teeth in response to a torque loading as in the case of the construction disclosed in said application. As best shown in the fragmentary sectional view Figure 8, the load carrying sides 43 of the clutch teeth 41 and the load carrying faces 44 of the clutch teeth 40 are sloped at a slight angle with respect to a line parallel to the axis of the shaft 6. However, this angle is slightly less than the angle of repose and consequently not sufficient to cause disengagement of the clutch teeth in response to the application of a clockwise torque transmitted by the ratchet to the holding ring. It is therefore necessary to apply a positive force to disengage the clutch teeth when they are under load.

As in the case of the corresponding teeth disclosed in said copending application, the clutch teeth 40 and 41 are so constructed that they will not engage during relative rotation between the holding ring 42 and the ratchet 37 even when subject to an axial force tending to cause engagement. Such a force is supplied in accordance with the present construction by means of a plurality of ball members 45 mounted in aligned bores in the flange 11 of sleeve 10 and the front face of the bell-shaped housing 7. A spring 46, positioned in each bore, normally urges the associated ball against the holding ring 42 in a direction to effect engagement of the clutch teeth 40 and 41. Any desired number of spring pressed balls may be provided around the holding ring, four being indicated in dotted lines in Figure 3, intermediate the cap screws 12.

The holding ring 42 is provided with a pair of diametrically opposed radially projecting ears 50. The projections 50 are identical in construction and mode of operation and their construction is best illustrated in Figures 3 and 4. As shown in the drawings, each ear 50 projects into a space between a pair of lugs 51 and 52 fixed to the flange 11 of the sleeve 10, with the result that the lugs 51 and 52 provide positive limits to the movement of the holding ring 42. Each of the projections 50 has a flat abutment face 53 adapted to engage a face 54 of the lug 51 to limit clockwise rotation of the holding ring 42, as viewed in Figure 3. The abutment faces 53 and 54 extend at such an angle that they make extended surface contact with each other. The surface of contact may either be parallel to the axis of the shaft 6 or may be inclined slightly so as to facilitate rearward sliding of the holding ring 42 when the abutment faces 53 and 54 are in contact with each other. This may be accomplished by making the angle indicated by the numeral 55 in Figure 4 slightly less than ninety degrees. However, it must not be sufficient to permit disengagement of the clutch teeth 40 and 41 in response to a torque load thereon.

The opposite edge of each projection 50 is beveled off at 56 to provide a relatively sharp edge adapted to engage the lug 52, and the lug 52 is provided with a correspondingly sharp edged projection 57 having its rearward face 58 parallel to the bevel edge 56 and its forward edge parallel to the holding ring 42. When the projection 50 is in the position illustrated in Figure 4, the dog clutch teeth 40 and 41 are in engagement, and it will be apparent that as long as the projection 50 remains in that position the projection 57 operates to prevent disengagement of the clutch teeth. Likewise, if the projection 50 is in engagement with the lug 52 on the right-hand side of the projection 57, as viewed in Figure 4, the projection 57 will keep the then disengaged clutch teeth 40 and 41 from engaging in response to the force exerted by the springs 46.

The holding ring 42 is also provided with a projection 60, shown in Figure 3, which enters a groove 61 in an axially shiftable rod 62 that is slidable in a pair of aligned bores 63 and 64 formed in the casing 8. A spring 65 is positioned within the bore 63 to urge the shift rod 62 to the right, as viewed in Figure 4, thereby maintaining the projections 50 in contact with the projections 52. If other means are provided elsewhere in the braking system for maintaining the shift rail 62 to the right, as viewed in Figure 3, the spring 65 may be dispensed with.

To facilitate insertion of the shift rod 62 its left-hand end, as viewed in Figure 3, is flattened off at the back side at 66, as best shown in the fragmentary sectional view of Figure 9. As a result, by rotating the shift rod through an angle of ninety degrees from the position shown in Figures 3 and 9, it may be inserted through the bore 64 and clear the projection 60. After the left-hand end has entered the bore 63 and the notch 61 is in position to receive the projection 60, the rail is turned to its operative position shown in Figures 3 and 9 and a special dowel screw 67, having a threaded section adjacent its head, is threaded into the housing 8. The dowel 67 has a smooth cylindrical portion indicated in dotted lines at 68 in Figure 3, which projects into the bore 63 and lies against the flat face 66 of shift rod 62 in order to prevent rotation of the latter in the finally assembled mechanism. The projection 60 remains in the notch 61 in all positions of the holding ring 42.

The right-hand end of the shift rod 62 may be connected in any suitable manner to the braking system of the vehicle to maintain the vehicle brakes applied when the rod 62 is shifted to the left, as viewed in Figure 3, and to release the brakes when shifted to the right into the position illustrated in Figure 3. Thus the rod 62 may, for example, be connected, in a manner more fully disclosed in applicant's aforementioned copending application, to a check valve in a hydraulic braking system or to the control valve of a power braking system of any desired type. In the latter case movement of the rod 62 to the left effects brake application.

The means for disengaging the dog clutch teeth 40 and 41 and thereby rendering the mechanism inoperative to hold the vehicle against unintentional movement, is best illustrated in Figure 1, although parts of the mechanism also appear in Figure 5. Referring to Figure 1, there is shown the flanged member 70 of any suitable form of universal joint carried by the propeller shaft of the vehicle and through which the rear axle is to be driven. The member 70, instead of being connected directly to the stub shaft 6 of the bevel pinion 5, as is the usual practice, is secured by means of bolts 71 to the flange 72 of a sleeve 73.

An oil seal of any suitable construction is provided between the sleeve 73 and housing 8, as indicated generally at 74. It will be noted that the periphery of the plate 18 is received in a suitable recess between the flanges 70 and 72. The interengaging surfaces of the plate 18 and the flanges 70 and 72 are finished surfaces and are so spaced with respect to each other that the plate 18 has a free rotational running fit with respect to the flanges. The plate, however, performs the function of preventing axial movement of the sleeve 73 relative to the pinion 6. Any suitable form of sealing gasket 75 is provided between the flanges 70 and 72 to seal the interior of the unit.

The sleeve 73 is connected to the sleeve 17 and consequently to the stub shaft 6 by means of an intermediate internally and externally splined sleeve 76. The external splines on the sleeve 76 have a sliding fit with corresponding internal splines on the sleeve 73, and the internal splines on the sleeve 76 have a sliding fit on the external splines formed on the sleeve 17. The splines on the sleeve 76 are so constructed that a reverse driving torque transmitted by the member 73 through the sleeve 76 to the pinion stub shaft 6 will exert a force effective to shift the sleeve 76 axially toward the rear or upwardly, as viewed in Figure 1. That means that either the internal or the external splines on the sleeve 76, or both, must be helical splines. Thus the internal splines on the sleeve 76 may be in the form of a left-hand helix, in which case the external splines on the sleeve 76 may be straight sliding splines or right-hand helical splines. Alternatively, the external spline on the sleeve 76 may be in the form of a right-hand helix and the internal splines straight.

It will be understood that application of a reverse torque to the propeller shaft by the motor of the vehicle, or application of a forward torque to the propeller shaft by the vehicle wheels, will shift sleeve 76 rearwardly; and that when a forward torque is applied to the propeller shaft by the motor, or a rearward torque is applied to the propeller shaft by the vehicle wheels, the sleeve 76 will be shifted forwardly. Accordingly, there exists a lost motion connection between the propeller shaft and the shaft 6. It is desirable to keep the angle between the internal and external splines on the sleeve 76 to the minimum value which will cause axial movement of the sleeve 76 in response to a relatively low reverse driving torque, since the smaller the difference in angle the less will be the rotary lost motion or backlash between the sleeve 73 and the sleeve 17 for a given axial movement of the sleeve 76. The optimum angle between the internal and external splines on the sleeve 76 depends upon the quality of workmanship and finish of the splined teeth, but lies somewheres between fifteen and thirty degrees. If, for example, the angle is to be a thirty degree angle this may be achieved by making either the internal or the external splines on the sleeve 76 straight splines and by making the other splines on sleeve 76 in the form of a helix having a thirty degree angle. The same result may be achieved by making the internal splines on sleeve 76 on a left-hand helix of fifteen degrees and the external splines on sleeve 76 on a right-hand helix of fifteen degrees.

By making the dog clutch teeth 40 and 41 quite small the amount of axial travel of the sleeve 76 required to effect disengagement may be correspondingly reduced and, therefore, the rotary lost motion in the power transmission system will be likewise reduced. In one actual embodiment of the mechanism in which the depth of the dog clutch teeth 40 and 41 was one-sixteenth of an inch and the angle between the internal and external splines on the sleeve 76 was twenty-two degrees, the clutch releasing mechanism operated with complete satisfaction and the backlash between sleeves 73 and 17 could not be detected during driving of the vehicle even though the projection 57 which, as hereinafter pointed out, prevents backlash under certain circumstances, is omitted.

In order to effect clutch release in response to axial travel of the sleeve 76, that sleeve is fixed at its rear end to a plate 77, the outer edges of which bear against a plurality of clutch release push rods 78 which are slidably fitted in suitable openings in the flange 23 of the pawl carrier. The rearward ends of the push rods 78 just contact the front surface of the holding ring 42 when the clutch teeth 40 and 41 are engaged and the sleeve 76 is in its forwardmost position, illustrated in Figure 1. When the sleeve 76 shifts rearwardly it operates through the push rods 78 to disengage the dog clutch teeth 40 and 41.

It is desirable to employ clutch engaging springs 46 which are relatively weak in order to insure that there is no possibility of engagement of the clutch teeth 40 and 41 while the teeth are moving relative to each other. Consequently, in order to relieve the springs 46 of the friction load required to shift the push rods 78 forwardly during clutch engagement, each of the push rods 78 is provided at its forwardly projecting end portion 79 with a head 80, and a spring 81 surrounding the portion 79 bears against the head 80 and the pawl carrier 23, thus urging the push rod 78 forwardly. As a result, when the sleeve 76 moves forwardly the springs 46 need only shift the holding ring 42 to effect clutch engagement. The springs 81 are preferably made sufficiently strong to hold the splined sleeve 76 in its forward position against a torque load of medium intensity tending to shift it rearwardly. The springs 81 should be as strong as possible without so resisting rearward shift of the sleeve that the vehicle starts with a noticeable jerk when the holding mechanism is released by a reverse torque applied by the engine to the propeller shaft.

Means are provided for manually disengaging the clutch teeth 40 and 41. This means comprises a pair of rotary cams on the ends of shafts 83 which are journaled in bushings 84 fixed in the casing 8, as best shown in Figures 1 and 3. The cams 82 are simply cylindrical heads on the shaft 83 which are notched out at 85 to provide a flat, diagrammatically located face lying alongside of the holding ring 42. The outer ends of the shafts 83 are fixed to a semicircular lever 86 which surrounds the upper half of the casing 8. A short rearwardly projecting arm 87 is fixed to the central portion of the lever 86, as best shown in Figure 7, and is connected by means of a fitting 88 to the internal wire element 89 of a Bowden wire assembly indicated generally at 90. Housing 91 of the Bowden wire is fixed in any suitable manner to a braket 92 secured to the forward face of the housing 8 by means of a pair of cap screws 93. As a result of this arrangement, operation of the Bowden wire 90 by any suitable manual instrumentality will effect pivotal movement of the lever 86 and cam the holding ring 42 rearwardly to disengage the clutch teeth 40 and 41. The rearwardly projecting arm 87 on the lever 86 is provided to compensate for the arcuate movement of the upper end of the arm and thereby effect a more nearly straight line movement of the Bowden wire element 89 to prevent binding.

For purposes of illustration the rod 97 is shown in the present application connected to the control valve of a well-known type of vacuum booster brake mechanism. Referring particularly to Figures 3, 10, and 11, it will be noted that the housing 95 of a Bowden wire is fixed to the housing 8 by means of a fitting 96, and that the inner wire element 97 of the Bowden wire is fixed to the rod 62 by a threaded fitting and a lock nut 98. The opposite end of the Bowden wire housing 95 is fixed in any suitable manner to a bracket 99 carried by a spacing sleeve 100 associated with the vacuum booster control valve mechanism, while the inner wire 97 of the Bowden wire is secured in any suitable manner to the end of a lever 101 which is fixed to shaft 102 journaled in the spacing sleeve 100. A yoke 103 fixed to the shaft 102 within the sleeve 100 co-operates with a pair of oppositely projecting trunnions 104 on a valve shifting rod 105, which forms a part of the booster control valve mechanism.

Except for the spacing sleeve 100 and the above described connections for operating the rod 105, the remaining structure shown more or less diagrammatically in Figure 10 is a well-known form of vacuum booster control valve and motor mechanism and forms no part of the present invention except in combination with the mechanism illustrated in Figures 1 through 9, and hence need not be described in detail. It is sufficient to point out that the tube 107 transmits the hydraulic brake fluid from a manually operated master cylinder, not shown, to a secondary or vacuum booster master cylinder 108 at the left-hand side of a plunger 109 therein. The right-hand end of the cylinder 108 is connected by means of a tube 110 to the hydraulic wheel brakes of the vehicle in the usual manner. The plunger 109 is provided with a port 111 which is closed by means of a valve 112 when the pistons 113 and 114 of the vacuum motor 115 move to the right, as shown in Figure 10. The motor cylinder 115 is divided into two compartments by a fixed wall 116, and the right-hand sides of the pistons 113 and 114 are constantly connected to a source of vacuum by inlet 117 and communicating passageways 118 and 119.

The pistons 113 and 114 have a common hollow piston rod 120 which provides a communicating passageway between the spaces at the left-hand sides of the two pistons, and those spaces are connected to a control valve assembly, indicated generally at 121, by means of a conduit 122. The casing of the control valve has an atmospheric inlet opening 123, the communication of which, with the conduit 122, is controlled by valve disc 124 of a three-way valve 125. A second disc 126 on the valve 125 operates to control flow through a port 127 which is supported upon a flexible diaphragm 128 and is connected by means of a rod 130 to the aforementioned rod 105. Port 127 is in communication with the source of vacuum in conduits 117 and 118 through a port 131. The control valve 126 is normally held in the position illustrated by spring 132 and the differential pressure acting upon the valve disc 124. In that position conduit 122 is connected to the source of vacuum and both sides of the pistons 113 and 114 are evacuated. The pistons under these conditions are held at their left-hand position by means of a spring 133.

Valve operating rod 105 is connected to a plunger 134 in a cylinder 135, and the lower end of the plunger 134 is connected to the cylinder 108 at the left-hand side of the plunger 109 by means of a passageway 136, with the result that the plunger 134 is always subject to the pressure developed by the manually operated master cylinder, not shown.

The normal operation of the mechanism shown in Figure 10 is as follows:

When the brake actuating mechanism is operated manually the pressure built up in the conduit 107 is transmitted initially to the brake line 110 through a port 111, and is also transmitted to the cylinder 135 by the passageway 136, thus lifting the plunger 134 and the valve operating rod 105. This lifts the diaphragm supported valve port 130 until it engages valve 125 and elevates it off its upper seat. This closes communication between the left-hand sides of the pistons 113 and 114 and the source of vacuum, and at the same time connects the left-hand sides of the pistons to atmospheric pressure entering through port 123. This atmospheric pressure shifts the pistons to the right, as viewed in Figure 10. The first effect of that movement is to close port 111. Thereafter the plunger 109 is shifted to the right, building up an augmented brake pressure in the brake line 110. The mechanism is so arranged that the pressure developed in line 10 is proportional to the pressure applied in line 107 and thus the operator has a feel of the degree of brake application.

In accordance with the present invention the holding ring 42 is connected by the means previously described to the brake operating rod 105. Consequently, when the ring is shifted in a counterclockwise direction, as viewed in Figure 3, the valve operating rod 105 will be operated, and the vehicle brakes applied through actuation of the pistons 113 and 114. In addition, manual application of the brakes will shift the holding ring 42 in a counterclockwise direction. The brakes will remain actuated as long as the holding member remains in its left-hand position but will be released as soon as the brake holding member returns to its right-hand position illustrated in the drawings.

The operation of the mechanism of the present invention is as follows:

During normal forward driving the torque applied by the propeller shaft to the rear axle will effect a forward shift of the sleeve 76 and, consequently, permit an engagement of the clutch teeth 40 and 41 under the influence of the springs 46. Since the pawl carrier 16 is rotating clockwise, as viewed in Figures 6, during forward movement of the vehicle, the ratchet wheel 37 will be free of engagement with the pawls 29 and hence will remain stationary to permit the above mentioned engagement of the clutch teeth 40 and 41. The spring 65, or other means for the same purpose, will hold the shift rod 62 to the right, as viewed in Figure 3, and therefore maintain the projection 50 on the holding ring in contact with lug 52 on the flange 11, as shown in Figure 3 and 4.

During ordinary forward driving there is a frequent reversal of torque on the power transmission system of the vehicle, since the vehicle wheels will tend to drive the power transmission system forwardly if the engine throttle is closed, and when the engine throttle is opened the engine will tend to drive the wheels forwardly. This reversal of torque tends to shift the sleeve 76 forwardly and backwardly. If such forward and backward motion of the sleeve were possible, no harm would be done because the resulting lost motion may, by proper design of the mechanism, be reduced to a negligible value. Moreover, no harm would result during forward driving if the clutch teeth 40 and 41 were rapidly disengaged and permitted to re-engage at each reversal of torque. However, not only do the springs 81 prevent lost motion, due to rearward movement of the sleeve 76 under ordinary reversals of torque, but all possibility of such lost motion is prevented by reason of the projection 57 which, as shown in Figure 4, engages the back side of the projection 50 on the holding ring when the clutch teeth 40 and 41 are engaged and the vehicle is in forward motion, and thereby positively holds the clutch teeth against disengagement. Since the clutch teeth cannot be disengaged the sliding sleeve 76 cannot move rearwardly and consequently there is no possibility of lost motion in the power transmission system.

If, during forward motion of the vehicle, the vehicle brakes are applied manually, shift rod 62 will be moved to the left, as viewed in Figure 3, thereby rotating the holding ring counterclockwise. This will disengage the projection 50 from the projection 57.

As a general rule the driver removes his foot from the accelerator pedal just before applying the brakes, and therefore there is a reversal of torque on the propeller shaft due to the wheels driving the engine during brake application (unless the vehicle clutch is disengaged). Any such reversal of torque will tend to shift the sleeve 76 rearwardly and release the clutch teeth 40 and 41. However, unless this torque reversal is unusually high, springs 81 will operate to prevent rearward movement of sleeve 76 and the mechanism will not be released. Moreover, the initial shock reversal of torque which occurs as soon as the accelerator is closed occurs before the brakes are applied and, therefore, before the projection 50 is freed from projection 57; and, therefore, the initial shock load will not effect disengagement of clutch teeth 40 and 41. Accordingly, under all ordinary conditions, if the brakes are released before the vehicle comes to a stop the holding unit will return to its normal position illustrated in the drawings.

If for any reason a heavy forward torque is transmitted to the engine by the vehicle wheels during brake application the clutch teeth 40 and 41 may be disengaged. In that event on release of the brakes the projection 50 will, on clockwise rotation of the holding ring 42, engage the lug 52 at the right-hand side of projection 57, and the holding mechanism will be held in inoperative condition until a subsequent brake application.

Regardless of whether or not the clutch teeth 40 and 41 are engaged, if the vehicle is brought to a stop by application of the brakes the holding ring 42 will be rotated counterclockwise under the influence of the brake application, and, as soon as the vehicle stops, the clutch teeth 40 and 41 will engage under the influence of springs 46 if they are not already engaged. The holding ring 42 is then in its extreme left-hand or counterclockwise position and it cannot return in a clockwise direction and thus permit release of the brakes because the pawls 29 on the pawl carrier 16 will engage the ratchet and prevent it from rotating clockwise. The pawl carrier itself cannot rotate clockwise because it is fixed to the wheels of the vehicle through the stub shaft of the differential pinion. Accordingly, the mechanism will operate under these circumstances to hold the brakes applied and thus prevent the vehicle from moving in either direction.

This is advantageous since it not only provides an automatic hill-holding mechanism which is effective when the car is facing forwardly downhill as well as backwardly downhill, but it likewise operates automatically to overcome the tendency of a vehicle equipped with a hydrokinetic clutch to creep forwardly when stopped on level ground with the engine idling and the mechanical clutch engaged.

When the brakes are being held applied in the manner described above and it is desired to drive the vehicle forwardly, the mechanism will automatically release when the vehicle is started forwardly in the normal manner, by reason of the fact that as soon as a forward driving torque is applied to the propeller shaft of the vehicle, the pawl carrier 16 will be rotated clockwise, as viewed in Figure 3, thus permitting a clockwise rotation of the ratchet wheel and holding ring sufficient to release the brakes of the vehicle without any forward motion of the vehicle wheels. This clockwise rotation of the pawl carrier 16, which is necessary to effect brake release, is possible without a rotation of the wheels as a result of the torsional twist or windup of the live axle shafts 4 and a twisting of the axle housing with respect to the vehicle frame on its spring suspension. Very little clockwise rotation of the pawl carrier is required to effect brake release. Therefore, the forward driving torque required to release the brakes is negligible, and the vehicle will start forwardly without any apparent hesitation.

If, during forward movement of the vehicle, the vehicle is brought to a stop without any application of the brakes, and the clutch teeth 40 and 41 are engaged, the mechanism will automatically prevent rollback of the vehicle on an incline, because reverse rotation of the pinion stub shaft 6 will rotate the pawl carrier 16 counterclockwise, as viewed in Figure 5, thereby rotating the ratchet wheel 37 and holding ring 42 in counterclockwise direction until the projection 50 on the holding ring 42 engages the lug 51 on the flange 11. When such engagement occurs no further counterclockwise motion of the holding ring can occur and, consequently, the pinion stub shaft 6 and the wheels of the vehicle to which it is connected are blocked against further reverse movement, even though the brakes are not applied. If, however, the shift rod 62 is connected to the vehicle brake system in the manner disclosed herein or otherwise, the counterclockwise motion of the holding ring will also effect brake application.

If the mechanism incorporates means for applying the brakes when the holding member is rotated counterclockwise, the mechanism will release upon application of forward driving torque to the propeller shaft by the motor of the vehicle in the manner described above. If no brake application occurs incident to counterclockwise rotation of the holding ring 42, the mechanism will still operate automatically to prevent rollback and the vehicle may be driven forwardly at any time by reason of the one-way clutch connection provided by the pawl and ratchet members 16 and 37.

If the vehicle is stationary and the mechanism is operating to hold the brakes applied or to prevent rollback of the vehicle, and it is desired to drive the vehicle in reverse it is only necessary to shift into reverse gear and clutch the motor of the vehicle to the power transmission system in the usual manner in order to effect the necessary release of the holding mechanism. This follows from the fact that the application of a reverse driving torque to the propeller shaft by the motor of the vehicle shifts sleeve 76 rearwardly, thereby disengaging the clutch teeth 40 and 41. Such disengagement permits the ratchet wheel 37 to rotate in a counterclockwise direction under the influence of the pawl carrier 16. As soon as the clutch teeth 40 and 41 are disengaged the brake holding ring will be rotated clockwise by spring 65 and the beveled edge of projection 50 will engage the parallel right-hand side of projection 51 and thereby shift the clutch teeth 41 out of contact with teeth 40. This prevents rubbing of the teeth on each other during reverse driving. If the brakes are applied during reverse travel the holding ring 42 will be shifted counterclockwise, and the clutch teeth 40 and 41 will again contact each other, but they will not make clutching engagement unless the vehicle stops. If the brakes are released before the vehicle stops, the holding ring will return in a clockwise direction and projection 51 will again shift the teeth 40 and 41 out of contact. If the brakes are not released until after the vehicle stops the clutch teeth will engage and return the mechanism to a holding condition.

The automatic release of the mechanism in response to a reverse torque applied to the power transmission system by the motor, not only eliminates the necessity of all mechanical connections with the reverse gear shift mechanism but it automatically effects a release of the mechanism at the exact instant that the reverse torque is applied to the vehicle wheels. This is of great advantage in starting a vehicle backward up a hill since it is a well-known fact that it is exceedingly difficult to perform that driving operation without encountering an excessive and destructive chatter in the power transmission system, particularly if the vehicle is heavily loaded and the incline is at all steep. This chattering condition results from the slight time lag between the release of the brakes which are holding the vehicle against forward movement and the time at which the reverse torque is applied to the driven wheels of the vehicle. During this time interval, however, short, the vehicle tends to start rolling forwardly and in order to prevent any substantial forward movement it is necessary to engage the clutch quickly. This, in turn, requires a relatively wide opening of the throttle to prevent stalling. As a result, a shock load is applied to the power transmission system in a direction reverse to that in which it is rotating and sets up an excessive and destructive chatter which cannot be stopped without disengaging the clutch between the motor and the power transmission system. The present mechanism overcomes this difficulty by reason of the fact that the release of the brakes is effected by the application of the reverse torque to the propeller shaft. Consequently, the operator may engage the vehicle clutch slowly without excessively accelerating the motor and thereby start the vehicle reversely up the hill before any forward movement occurs. This entirely avoids the chattering difficulty mentioned above.

Occasionally the wheels of the motor vehicle are caught in a mud hole or a rut formed in snow or ice, with the result that it is not possible to extricate the vehicle by normal forward or reverse driving. The customary method of extricating the vehicle from such a situation is to place it in either forward or reverse gear and rock it back and forth in the rut or mud hole by alternately engaging and disengaging the vehicle clutch. If the circumstances are such that it is necessary to place the vehicle transmission in a forward gear to impart the necessary rocking action, it would be highly undesirable to have the antirollback mechanism operate automatically to prevent rollback of the vehicle, since that would entirely prevent the driver from extricating the vehicle. This possible difficulty is entirely avoided by the present mechanism by reason of the fact that as soon as the clutch teeth 40 and 41 are disengaged by application of a reverse torque to the propeller shaft from the motor, the holding ring 42, under the influence of spring 65 and rod 62, will shift into a position in which the projection 50 engages the lug 52 on the right-hand side of the projection 57, as viewed in Figure 4. The projection 57 will prevent re-engagement of the clutch teeth 40 and 41. Accordingly, it is only necessary for the driver to first place the vehicle in reverse gear and apply a slightly reverse torque sufficient to release the mechanism. Thereupon he may place the transmission in a forward gear and perform the usual rocking operation to extricate the vehicle. Throughout this operation, the projection 57 will retain the clutch teeth 40 and 41 disengaged and, therefore, the mechanism will not prevent the necessary free rollback of the vehicle in the mud or mud hole. The mechanism will remain inoperative under these conditions until a succeeding operation of the brakes which will shift the holding ring 42 in a counterclockwise direction and thus shift the projection 50 away from the back side of the projection 57 so that the springs 46 may effect clutch engagement.

When the vehicle is being driven rearwardly, either up or down an incline, and it is brought to a stop, the normal reaction of the driver is to apply the brakes to prevent free rolling on the incline. This brake application automatically returns the mechanism to operative condition, and it is then effective to hold the vehicle against unintentional movement in either direction.

It will be apparent from the above that the mechanism of the present invention automatically takes care of all normal drive conditions without requiring any special or unconventional manipulations of the vehicle by the driver. Accordingly, to meet all ordinary requirements, no separate manual means to release the mechanism is required. However, such a means is provided, as shown in the illustrated embodiment of the invention, to take care of the remote possibility that the vehicle motor should die and allow the vehicle to stop while it is ascending a hill. Under these circumstances the device would automatically operate to prevent unintentional rollback of the vehicle which is, of course, a highly desirable result. However, if the engine could not be restarted and it was necessary to pull the vehicle off to the side of the road by coasting it rearwardly down the hill there would be no means of releasing the hill holding mechanism because the torque responsive release mechanism of the present invention requires the application of torque from the motor vehicle. It is to avoid this rather remote contingency that the manual release means is provided.

The essential feature of the improved release mechanism resides in the use of a torque responsive or lost motion mechanism associated with the power transmitting system of the vehicle for releasing the holding mechanism for reverse driving. In the preferred embodiment of the invention illustrated and described herein, this mechanism takes the form of an axially floating splined sleeve which provides a lost motion in the power transmission system and which moves axially to release the holding mechanism in response to reverse torque applied to the motor of the vehicle. This form of lost motion connection is extremely rugged, easy to manufacture in mass production, and occupies very little space. It will be appreciated, however, that other forms of torque responsive means or lost motion connections are available which may be employed to perform the reverse releasing function without departing from the spirit of the invention or the scope of the appended claims.

It will be appreciated that the reverse release mechanism of the present invention is not only applicable to a combined brake holding and noback mechanism, such as that disclosed herein and in said copending application, but to any mechanism for preventing unintentional movement of the vehicle either backwardly or forwardly or both, regardless of whether or not said mechanism is associated with the vehicle brakes.

What is claimed is:

1. In combination, a mechanism for preventing unintentional movement of a motor vehicle, means adapted to form a part of the power transmitting system of the vehicle, said means including three torque transmitting elements connected in series and adapted for connection between a power source and a driven wheel of the vehicle, the intermediate element having a sliding spline connection with both of the other elements, the spline connecting the intermediate element to one of the other elements being a helical spline and the other spline connection being of a different angle from the first spline connection such that the application of a driving torque to either end of said series of elements tends to effect an axial shift of the intermediate element relative to the other elements, and means operable in response to the axial shift of said element in one direction for rendering said mechanism inoperative.

2. In combination, a mechainsm for preventing unintentional movement of a motor vehicle, means adapted to form a part of the power transmitting system of the vehicle, said means including three torque transmitting elements connected in series, said elements including one element adapted for connection to a reversible power source, another element adapted for connection to a driven wheel of the vehicle, and an intermediate element having a sliding spline connection with both of the other elements, the spline connecting the intermediate element to one of the other elements being a helical spline and the other spline connection being of a different angle from the first spline connection such that the application of a driving torque to either end of said series of elements tends to effect an axial shift of the intermediate element relative to the other elements, and means operable in response to the axial shift of said intermediate element incident to application of reverse driving torque to said one element while said torque is resisted by said other element for rendering said mechanism inoperative.

3. In combination, a mechanism for preventing unintentional movement of a motor vehicle, means adapted to form a part of the power transmitting system of the vehicle, said means including three torque transmitting elements connected in series, said elements including one element adapted for connection to a reversible power source, another element adapted for connection to a driven wheel of the vehicle, and an intermediate element having a sliding spline connection with both of the other elements, the spline connecting the intermediate element to one of the other elements being a helical spline and the other spline connection being of a different angle from the first spline connection such that the application of a driving torque to either end of said series of elements tends to effect an axial shift of the intermediate element relative to the other elements, means operable in response to the axial shift of said intermediate element incident to application of reverse driving torque to said one element while said torque is resisted by said other element for rendering said mechanism inoperative, and means for preventing said axial shift of said intermediate element during forward rotation of said other element.

4. In combination, a mechanism for preventing unintentional movement of a motor vehicle, means adapted to form a part of the power transmitting system of the vehicle, said means including three torque transmitting elements connected in series, said elements including one element adapted for connection to a reversible power source, another element adapted to be connected to a driven wheel of the vehicle, and an intermediate element having a sliding spline connection with both of the other elements, the spline connecting the intermediate element to one of the other elements being a helical spline and the other spline connection being of a different angle from the first spline connection such that the application of a driving torque to either end of said series of elements tends to effect an axial shift of the intermediate element relative to the other elements, means operable in response to the axial shift of said element incident to application of reverse driving torque to said one element while said torque is resisted by said other element for rendering said mechanism inoperative, and resilient means resisting axial shift of said intermediate element in said one direction.

5. In a mechanism for automatically preventing unintentional movement of a motor vehicle, a rotary power transmitting device having freedom for limited rotation of one portion thereof relative to another portion thereof in response to the transmission of torque through said device, a holding member mounted for limited rotation between two positions, means for connecting said member to said other portion of said device, said means including a clutch and a one-way driving connection effective to cause rotation of said member to one of its positions when said other portion rotates reversely and said clutch is engaged, said member being effective in said one position to prevent movement of the vehicle, resilient means normally tending to cause engagement of said clutch, and torque responsive means operable in response to an application of reverse driving torque to said one portion of said device while said torque is resisted by said other portion to disengage said clutch.

6. In a mechanism for automatically preventing unintentional movement of a motor vehicle, a rotary power transmitting device having freedom for limited rotation of one portion thereof relative to another portion thereof in response to the transmission of torque through said device, a holding member mounted for limited rotation between two positions, means for connecting said member to said other portion of said device, said means including co-operating dog clutch members and a one-way driving connection effective to cause rotation of said member to one of its positions when said other portion rotates reversely and said dog clutch members are engaged, said member being effective in said one position to prevent movement of the vehicle, resilient means normally tending to cause engagement of said dog clutch members, the teeth of said dog clutch members also being so constructed that the clutch members will not engage until there is substantially no relative movement between the dog clutch members, and torque responsive means operable in response to an application of reverse driving torque to said one portion of said device while said torque is resisted by said other portion to disengage said dog clutch.

7. In a mechanism for automatically preventing unintentional movement of a motor vehicle, a holding member mounted for limited rotation between two positions, a rotary element of the power transmission system of the vehicle, means for connecting said member to said element, said means including a clutch and a one-way driving connection effective to cause rotation of said member to one of its positions when the element rotates reversely and said clutch is engaged, said member being effective in said one position to prevent movement of the vehicle, resilient means normally tending to cause engagement of said clutch, means for disengaging said clutch to permit driving in reverse gear, means for automatically holding said clutch disengaged after it has been disengaged, and driver controlled means for rendering said last mentioned means ineffective.

8. In a mechanism for automatically preventing unintentional movement of a motor vehicle, a holding member mounted for limited rotation between two positions, a rotary element of the power transmission system of the vehicle, means for connection effective to cause rotation of said means including a clutch and a one-way driving conenction effective to cause rotation of said member to one of its positions when the element rotates reversely and said clutch is engaged, said member being effective in said one position to prevent movement of the vehicle, resilient means normally tending to cause engagement of said clutch, means for disengaging said clutch to permit driving in reverse gear, means for automatically holding said clutch disengaged after it has been disengaged, and means adapted to be connected to the vehicle braking system and operable automatically upon actuation of the brakes to render said last mentioned means ineffective.

9. In a mechanism for automatically preventing unintentional movement of a motor vehicle, a holding member mounted for limited rotation between two positions, a rotary element of the power transmission system of the vehicle, means for connecting said member to said element, said means including a dog clutch and a one-way driving connection effective to cause rotation of said member to one of its positions when the element rotates reversely and said dog clutch is engaged, said member being effective in said one position to prevent movement of the vehicle, resilient means normally tending to cause engagement of said dog clutch, the teeth of said dog clutch also being so constructed that the clutch will not engage until there is substantially no relative movement between the dog clutch members, means for disengaging said dog clutch to permit driving in reverse gear, means for automatically holding said clutch disengaged after it has been disengaged, and driver controlled means for rendering said last mentioned means ineffective.

10. In a mechanism for automatically preventing unintentional movement of a motor vehicle, a holding member mounted for limited rotation between two positions, a rotary element of the power transmission system of the vehicle, means for connecting said member to said element, said means including a dog clutch and a one-way driving connection effective to cause rotation of said member to one of its positions when the element rotates reversely and said dog clutch is engaged, said member being effective in said one position to prevent movement of the vehicle, resilient means normally tending to cause engagement of said dog clutch, the teeth of said dog clutch also being so constructed that the clutch will not engage until there is substantially no relative movement between the dog clutch members, means for disengaging said dog clutch to permit driving in reverse gear, means for automatically holding said clutch disengaged after it has been disengaged, and means adapted to be connected to the vehicle braking system and operable automatically upon application of the brakes to render said last mentioned means ineffective.

11. A pawl and ratchet clutch for use under lubricant immersion comprising a toothed ratchet wheel, a pawl carrier, a plurality of pawls pivoted to said carrier and adapted to cooperate with said ratchet wheel, a loose ring associated with said pawls for limiting the extent to which the pawls swing out of engagement with said ratchet wheel, said ring being effective to transmit the centrifugal force exerted by those pawls which swing furthest out of contact with the ratchet wheel to other pawls in a direction to cause at least one of said other pawls to engage the ratchet wheel, said ring having pawl engaging cam surfaces, each of which slope at such an angle that any frictional resistance to rotation of the ring tends to cam the pawls inwardly.

12. In combination, a rotary power vehicle transmission device having freedom for limited rotation of one portion thereof relative to another portion thereof in response to the transmission of torque through said device, said one portion being adapted for connection to a reversible power source and the other to a driving wheel of the vehicle, said device being adapted to rotate in one direction when the vehicle is moved forwardly and reversely when the vehicle is moved in reverse, a movable element adapted for connection to the brake applying means of the vehicle and movable from one position when the brake applying means is in applied position to another position on release movement of the brake applying means, means for automatically holding said movable element in said one position, and means responsive to reverse rotation of said one portion of the device relative to the other portion for releasing said holding means.

13. In combination, a rotary power vehicle transmission device having freedom for limited rotation of one portion thereof relative to another portion thereof in response to the transmission of torque through said device, said one portion being adapted for connection to a reversible power source and the other to a driving wheel of the vehicle, said device being adapted to rotate in one direction when the vehicle is moved forwardly and reversely when the vehicle is moved in reverse, a movable element adapted for connection to the brake applying means of the vehicle and movable from one position when the brake applying means is in applied position to another position on release movement of the brake applying means, means including a disengageable clutch connecting said element to said other portion of said device for moving said element into said one position in response to reverse rotation of said other portion of the device, and torque responsive means operatively associated with said device for disengaging said clutch in response to the application of a reverse torque to said one portion of said device while the other portion is resisting said torque.

14. The combination set forth in claim 12, further characterized by the provision of resilient means to resist reverse rotation of said one portion of the device relative to the other portion.

15. The combination set forth in claim 14, further characterized by the provision of resilient means to resist reverse rotation of said one portion of the device relative to the other portion.

16. In combination, a rotary power vehicle transmission device having freedom for limited rotation of one portion thereof relative to another portion thereof in response to the transmission of torque through said device, said one portion being adapted for connection to a reversible power source and the other to a driving wheel of the vehicle, said device being adapted to rotate in one direction when the vehicle is moved forwardly and reversely when the vehicle is moved in reverse, mechanism for preventing unintentional movement of the vehicle, means responsive to reverse rotation of said one portion of the device relative to the other portion for rendering said mechanism ineffective, and means to prevent reverse rotation of said one portion of the device relative to the other portion when the other portion of the device is rotating forwardly.

17. The combination set forth in claim 12, further characterized by the provision of means to prevent reverse rotation of said one portion of the device relative to the other portion when the other portion of the device is rotating forwardly.

18. In combination, a rotary power vehicle transmission device having freedom for limited rotation of one portion thereof relative to another portion thereof in response to the transmission of torque through said device, said one portion being adapted for connection to a reversible power source and the other to a driving wheel of the vehicle, said device being adapted to rotate in one direction when the vehicle is moved forwardly and reversely when the vehicle is moved in reverse, mechanism for preventing reverse rotation of said other portion of said device, means responsive to reverse rotation of said one portion of the device relative to the other portion for rendering said mechanism ineffective, and means to prevent reverse rotation of said one portion of the device relative to the other portion when the other portion of the device is rotating forwardly.

19. The combination set forth in claim 14, further characterized by the provision of means to prevent reverse rotation of said one portion of the device relative to the other portion when the other portion of the device is rotating forwardly.

20. In combination, a rotary power vehicle transmission device having freedom for limited rotation of one portion thereof relative to another portion thereof in response to the transmission of torque through said device, said one portion being adapted for connection to a reversible power source and the other to a driving wheel of the vehicle, said device being adapted to rotate in one direction when the vehicle is moved forwardly and reversely when the vehicle is moved in reverse, mechanism for preventing reverse rotation of said other portion of said device, said mechanism including a holding member and a dog clutch and one-way driving connection connected in series between said member and said other portion of said element, means responsive to reverse rotation of said one portion of the device relative to said other portion for disengaging said clutch, resilient means tending to cause engagement of said clutch, means for preventing re-engagement of the clutch after it is disengaged, and driver controlled means for rendering said last mentioned means ineffective.

CHARLES M. JAMESON.

REFERENCES CITED

The following references are of record in the file of this patent:

UNITED STATES PATENTS

| Number | Name | Date |
|---|---|---|
| 2,135,897 | Jameson | Nov. 8, 1938 |
| 2,175,061 | Matson | Oct. 3, 1939 |
| 2,181,700 | Leichsenring | Nov. 28, 1939 |
| 2,218,398 | Jameson | Oct. 15, 1940 |
| 2,251,466 | Payson | Aug. 5, 1941 |
| 2,296,619 | Rauen | Sept. 22, 1942 |